Jan. 12, 1960 M. C. LOWMAN 2,921,102
CATALYTIC HYDROCARBON CONVERSION PROCESS
Filed Jan. 18, 1957 2 Sheets-Sheet 1
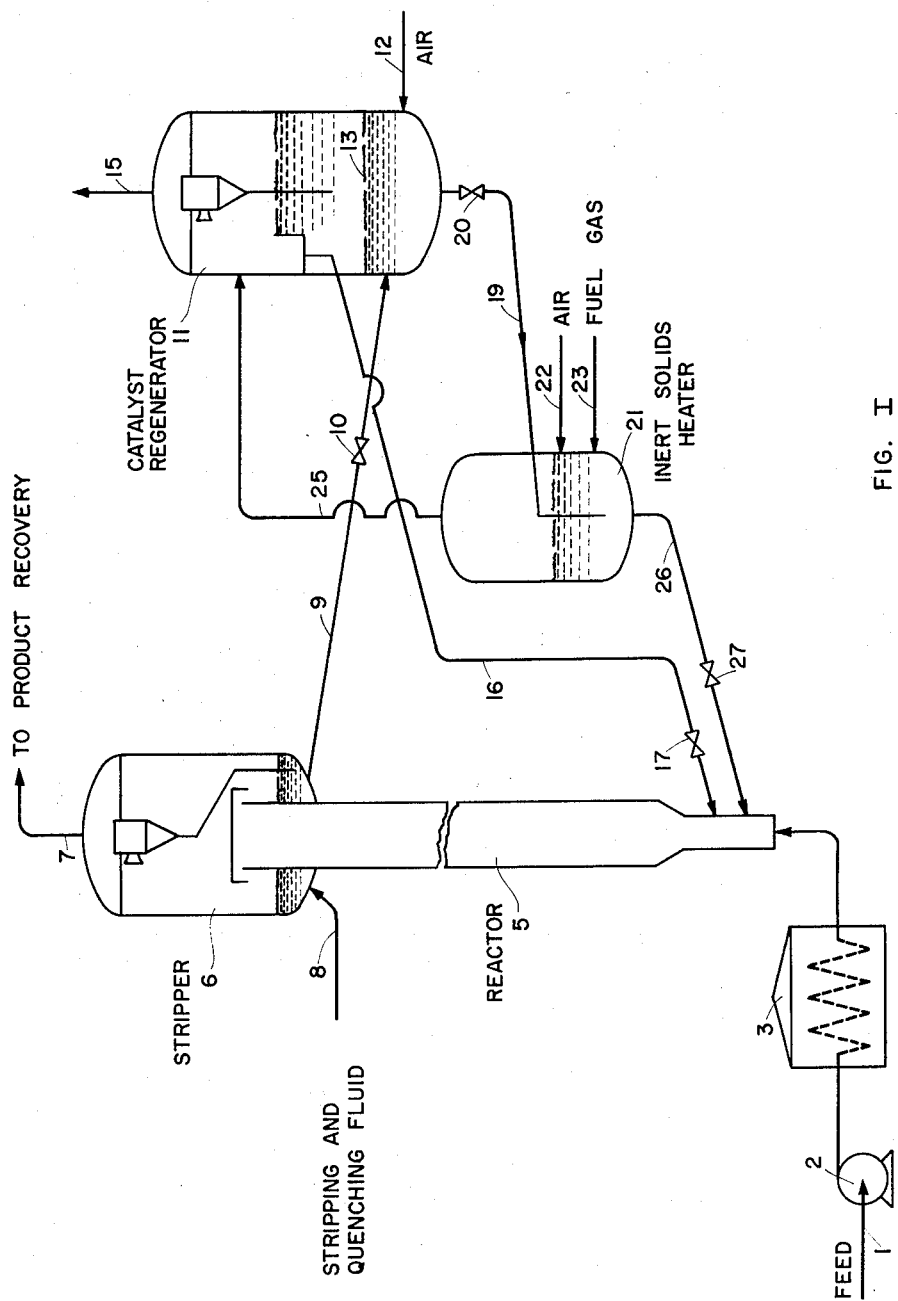
FIG. I
INVENTOR:
MALDEN CARR LOWMAN
BY:
HIS AGENT

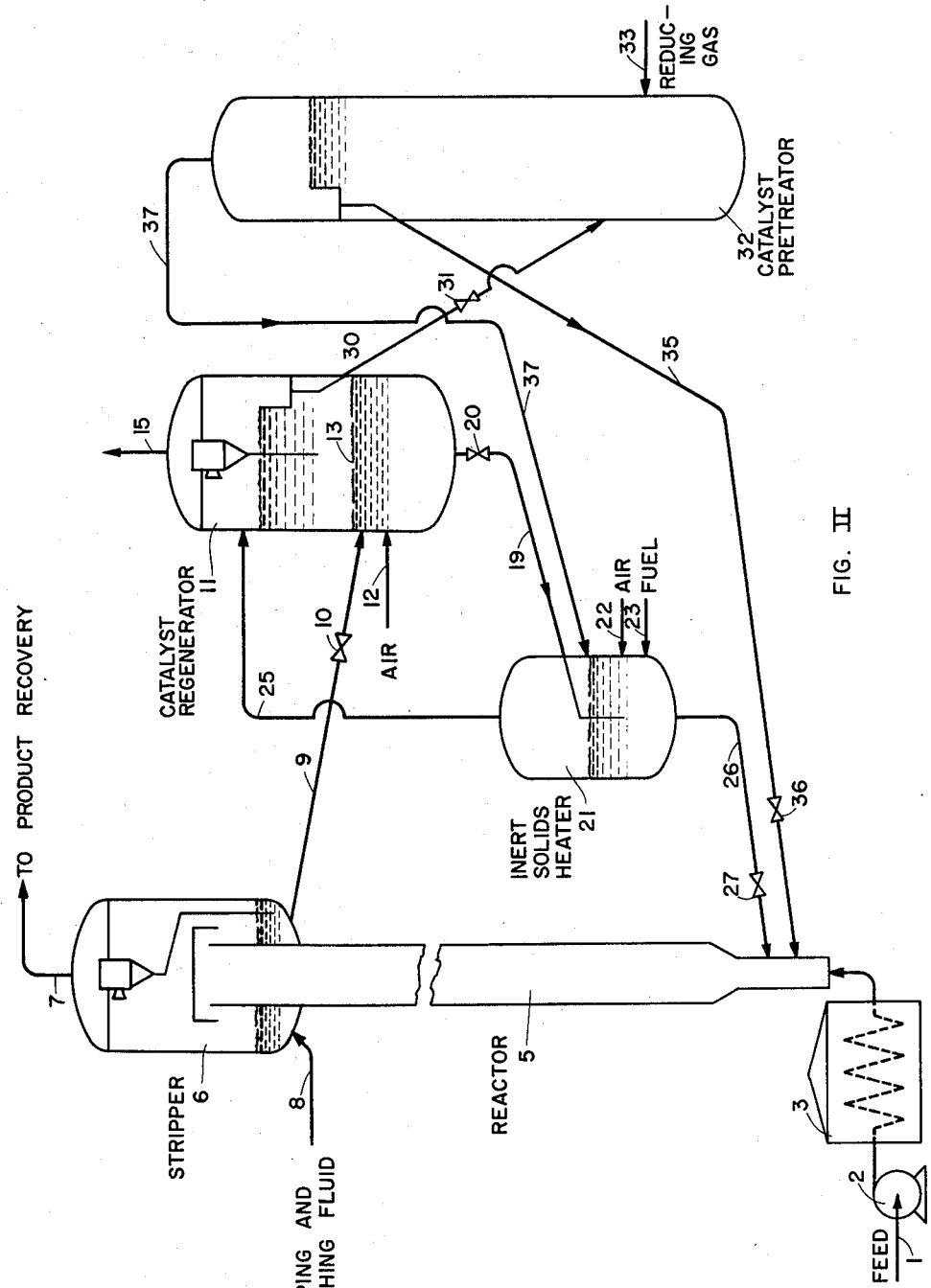
FIG. II
INVENTOR:
MALDEN CARR LOWMAN
BY: John H. Colven
HIS AGENT

United States Patent Office

2,921,102
Patented Jan. 12, 1960

2,921,102

CATALYTIC HYDROCARBON CONVERSION PROCESS

Malden Carr Lowman, San Rafael, Calif., assignor to Shell Development Company, New York, N.Y., a corporation of Delaware Application January 18, 1957, Serial No. 634,925

5 Claims. (Cl. 260—680)

This invention relates to improved catalytic hydrocarbon conversion processes carried out at comparatively high temperatures.

It has been found that certain hydrocarbon processes may be more effectively carried out by subjecting the hydrocarbon feed to contact with a suitable catalyst at comparatively high temperatures for short periods of time. In this way, better and more efficient conversion is obtained than when the reaction is carried out at lower temperatures for longer periods of time. This applies particularly to endothermic reactions such as dehydrogenation, e.g. of butane to butenes and butadiene and butenes to butadiene.

A combination of apparatus in which the above principle may be utilized comprises an upright reactor having a large length to diameter ratio, i.e. a "riser," through which the feed and circulating fluidized catalyst are sent at a high velocity, a separate catalyst regenerator in which the carbonaceous deposits are burned off the catalyst particles with an oxygen-containing gas, with suitable transfer means therebetween and solids-vapor separation means. It has been the practice in the type of process contemplated to supply the heat requirements of the reactor by superheating the catalyst to a temperature significantly above the temperature of reaction prior to transferring it to the reactor.

One of the major problems connected with this type of operation involves the sensitivity to heat of the catalyst. All hydrocarbon conversion catalysts tend more or less to break down when subjected to high temperatures for any appreciable length of time, i.e. their active sites become deactivated by the excessive thermal activity of the particles making up the catalyst. Thus any modification which minimizes the time at which the catalyst is subjected to excessively high temperatures is considered very beneficial.

Another problem involved with the above-described type of process is the control of the temperature in the reactor, e.g. so that it does not go high enough to excessively thermally crack the reactants, or low enough to reduce significantly the desired selectivity of conversion. This control is somewhat difficult to obtain when both the catalyzation and heat requirements of the process are hinged to the quantity and temperature of the catalyst entering the reactor.

It is an object of this invention to provide an improved process of carrying out a catalytic hydrocarbon conversion process wherein the feed is contacted with the conversion catalyst at a high temperature for short periods of time.

It is a further object of this invention to provide an improved hydrocarbon conversion process utilizing a reactor having a large length to diameter ratio, circulating fluidized catalyst, and a separate catalyst regenerator, and wherein heat is transferred easily into the reactor, temperature control in the reactor is readily achieved and the hydrocarbon is subjected simultaneously to a high temperature and contact with the catalyst for a minimum period of time.

Now, it has been found that these objects are attained by utilizing a particulate inert heat transfer medium and, in addition to the riser reactor and catalyst regenerator, a separate chamber wherein the inert particles may be heated to a temperature suitable for transferring heat into the reactor in an amount sufficient to maintain the reaction. The inert material is of such density and particle size that it will separate from the catalyst in the dense bed of the catalyst regenerator. This arrangement permits heat to be transferred into the reactor easily, since the inert particles, unlike the catalyst, may be heated without disadvantage to a temperature considerably higher than the temperature of reaction so as to provide a significant temperature differential between said inerts and the catalyst and feed at the bottom of the reactor. The temperature of reaction is controlled by regulating the temperature and the amount of inerts entering the reactor independent of the catalyst. The period of time that the catalyst is subjected to high temperature is kept to a minimum by means of an inert fluid stripping and quenching medium which is at a substantially lower temperature than the catalyst and is contacted with the catalyst in a stripping zone through which the catalyst passes after leaving the reactor.

The invention will be described in greater detail with reference in part to the accompanying drawing, wherein:

Fig. I is a schematic diagram of apparatus and process lines for practicing the invention according to one embodiment thereof;

Fig. II is a schematic diagram of apparatus and process lines for practicing the invention in accordance with a further embodiment of it.

According to the scheme of Fig. I, the feed in line 1 is transferred by means of pump 2 to heater 3 where it is at least partially vaporized, if not already a gas, and preheated to some temperature below the actual temperature of reaction, e.g. 100–300° F. below such reaction temperature. Part of the feed may remain in liquid form as a fine mist suspended in the gaseous part of the feed. The preheating is for the purpose of providing enough heat to the feed so that the quantity and temperature of the inerts may be kept within reasonable limits since if the inerts must be heated to too high a temperature to enable the feed to reach the temperature of reaction, undesirable local thermal reactions in the vicinity of the inert particles may occur. The vaporized feed from the heater enters the bottom of the reactor 5 which has a relatively small inside diameter, e.g. 2 to 6 feet, and a large length-to-inside diameter ratio, e.g. 15 to 50. Such feed is at a temperature somewhat below the temperature of reaction and also below the temperature at which undesirable thermal reactions can occur to any great degree and is charged in sufficient quantity that the average superficial linear velocity of the material through the reactor is sufficiently high to suspend and carry both the catalyst and inert particles, e.g. at least 15 and as high as 50 feet or more per second. It should be noted that the number of mols of gas leaving the reactor is usually considerably greater than the number entering due to the nature of the reactions which take place; the velocity of gas near the inlet of the reactor is therefore much lower than the average while the velocity at the outlet end is significantly greater. Also entering the bottom of the reactor are catalyst from the regenerator and inert solids from the inert solids heater through lines 16 and 26 respectively. The temperature of the inert solids will be at least 100° F. higher than that of the catalyst or feed and sufficiently high to provide enough heat to keep the temperature of reaction uniformly at the desired level, e.g. 1,000 to 1,200° F. at the inlet of the reactor and somewhat less, e.g. 100° F. less at the top. The velocity of gaseous feed is sufficient to cause the particles of the catalyst and inert particles to rise up through the reactor at an increasing velocity which almost equals the gas velocity at the reactor outlet. The feed and catalyst particles are quickly heated at the bottom of the reactor to the temperature of reaction which is intermediate between the temperature of the entering feed and catalyst and that of the inert particles. The material remains in the reactor a very short period of time, e.g. under 12 seconds, during which time the desired reaction takes place. For a process of dehydrogenating butanes to butenes and butadiene, the feed will usually be in the reactor under 5 seconds.

Mounted at the top of the reactor is a stripper 6 wherein the hot gaseous products are contacted with a stream of relatively cool inert fluid stripping and quenching medium, e.g. steam or nitrogen which enters the stripper through line 8 and cools the catalyst to a temperature below the temperature of reaction at which the catalyst does not tend to become readily inactivated, the magnitude of temperature decrease depending on the temperature and the quantity of the stripping and quenching fluid. The stripper may be any apparatus which effects a mixture of fluid stripping medium and materials coming from the reactor and causes a substantial separation of solids and gases in said mixture. For example, it may be a zone of enlarged cross-section superimposed on the reactor wherein solids from the latter separate out of the vapor stream. A series of baffles and a cyclone separator in such a stripping section effect a separation of most of the gaseous products from the catalyst and inert particles. In some cases, one or more cyclones would be sufficient as a stripping zone. The gaseous product leaves the top of the stripper through line 7 and may be treated by conventional means to recover unreacted components which may be recycled in the process (not shown).

The catalyst and inert particles, suspended in a comparatively small amount of gas flow into the catalyst regenerator through line 9, the rate of flow being regulated by valve 10. Regeneration air or other oxygen-containing gas enters the bottom of the regenerator through line 12 and the coke is burned off the catalyst and inert particles. The rate of combustion is regulated by controlling the quantity of gas entering the regenerator and/or the percentage of oxygen in the regeneration gas. The regeneration is carried out such that the temperature of the catalyst particles is raised only to a temperature at which it does not become readily inactivated and considerably below that which would be necessary if the catalyst were relied on to satisfy all the heat requirements of the process. A dense bed of particles suspended in gas, such gas moving at a superficial linear velocity of about ½ to 3 feet per second, forms in the regenerator. Because of the large particle size and/or high density of the inert particles as compared to the catalyst, the former separate from the catalyst particles in the regenerator forming two layers of particles with a diffuse interface at 13. Waste gases leave the regenerator through the stack 15 after first passing through a cyclone separator to remove fine particles. The catalyst leaves the regenerator through line 16 flowing downward to the bottom of the reactor, the rate of flow being controlled by valve 17. The inert particles leave the regenerator through line 19 and flow downward to inert solids heater 21, the rate of flow being controlled by valve 20. Air and fuel gas entering the heater through lines 22 and 23 cause the inert particles to be heated to a temperature at least 100° F. above the temperature of reaction. The temperature to which the inerts are heated may be regulated by controlling the rates of air and fuel gases into the heater. Combustion gas from the heater is sent through line 25 to the regenerator to aid in the recovery of catalyst fines. Inert particles in heater 21 move downward in a dense bed suspended in gas moving at a superficial linear velocity of ½ to 3 feet per second and flow to the bottom of the reactor through line 26, the rate of flow being controlled by valve 27. The cycle is then repeated.

The process may be modified somewhat by a separate pretreatment of the catalyst, i.e. contacting it with a reducing gas, e.g. carbon monoxide or a hydrogen-containing gas, such as process tail gas. The nature of the mechanism of pretreatment is not known in great detail except that it probably serves the purpose of reducing over-oxidized catalyst and stripping water from the surface of the particles. This modification is illustrated in Fig. II wherein the flow of materials is similar to that in Fig. I except that the catalyst flows from the regenerator through line 30 to the bottom of pretreater 32, the rate of flow being controlled by valve 31. The reducing gas also enters the bottom of the pretreater through line 33. The gaseous medium which forms part of the dense bed of catalyst particles in the pretreater moves upward at a superficial linear velocity of ½ to 3 feet per second, and the catalyst is transferred from the pretreater to the reactor through line 35 which connects with the pretreater near the top of the catalyst bed. The rate of flow of catalyst through line 35 is controlled by valve 36. The combustible reducing gas from the pretreater flows through line 37 to the inert solids heater 21 wherein its combustion contributes to the raising of the inert solids to the temperature at which they enter the reactor. If the heat obtained from such combustion is not sufficient to raise the inert solids to the desired temperature, supplementary fuel gas may be added to the heater through line 23.

In the process described, the various units are placed so as to take advantage of gravity flow as much as possible. However, in some cases where this is impossible or inefficient, various propelling means such as pumps may be employed.

The specific pressures and temperatures in the various zones of the process in any particular process are dictated by the specific reaction being carried out and materials being used. Usually the temperature of reaction is over 1000° F. since it is at these temperatures that heat transfer and temperature control often become difficult problems. Moreover, the process is most useful with strongly endothermic reactions since heat transfer is then more of a problem then with heat neutral or exothermic reactions. However, where heat transfer is a problem with the latter types of reaction, e.g. because of heat lost to the surroundings, the process of this invention may be used.

The catalyst to be used depends on the particular reaction to be carried out. Examples of catalysts which may be used are those comprising chromia and alumina for dehydrogenation reactions. The particle size of the catalyst is within the range necessary for circulating a fluidized catalyst, e.g. 100–300 mesh.

The inert heat transfer medium may be any inert refractory material having a high specific heat and a density such that very small sized particles, e.g. 40 to 200 mesh, will tend to separate out when mixed with particles of conventional catalyst in the dense bed of the regenerator. Examples of this type of material are sintered magnesia, sintered alpha-alumina, Carborundum and zirconia.

Low pressure steam, e.g. at 5 to 50 p.s.i.g., is the most suitable as a stripping and quenching medium. However, other cool inert fluids may be used, e.g. water.

EXAMPLE

The process of the invention is illustrated by showing how the process is applied to the dehydrogenation of butane to n-butenes and butadiene by means of the flow plan of Fig. II.

At the bottom of the reactor having an inside diameter of 4 feet and a length of 75 feet are introduced 7500 barrels per day (1100 mols per hour) of feed at 1100° F.

and containing approximately 90% butane. Also entering the reactor at 1050° F. are 10,000 pounds per minute of a 200 mesh potassia promoted chromia-alumina catalyst containing 20% chromia and 5000 to 7000 pounds per minute of 60 mesh Carborundum at 1400° F. The reaction temperatures and pressures in the reactor vary from 1200° F. and 6 p.s.i.g. at the bottom to 1100° F. and 1 p.s.i.g. at the top. The vapors travel up the reactor at an average superficial linear velocity of 36 feet per second and carry the materials into the stripper which is mounted at the top of the reactor and has an inside diameter of 9 feet and a length of 26 feet. Low pressure steam in an amount of 5700 pounds per hour is introduced at the bottom of the stripping section. Approximately 9000 s.c.f./min. of air are sent into the regenerator which is 12 ft. I.D. by 18 ft. in length to burn the coke off the catalyst and inert heat transfer particles. Sufficient air and reformer tail gas in addition to the hydrogen-rich gas from the pretreater are sent into the inert solids heater which is about 8 ft. I.D. by 16 ft. in length to heat the inert solids entering the reactor to 1400° F. The catalyst is contacted with 550 s.c.f./min. of hydrogen-rich dry absorber gas at approximately the temperature of regeneration in the pretreater which has an inside diameter of 7 feet and is 50 feet long. The total product gases coming from the stripper are separated, using conventional separation means, into 610 mols per hour of a butane-rich fraction which is recycled to the reactor and 1640 mols per hour of a n-butene rich fraction containing butadiene which is sent to product recovery. The composition of total feed (including recycled gases) and total product are shown in Table I.

Table I

| Component | Total Feed | | Total Product | |
|---|---|---|---|---|
| | Percent w. | Percent m. | Percent w. | Percent m. |
| $H_2$ | | | 1.7 | 30.9 |
| $CH_4$ | | | 2.1 | 4.9 |
| $C_2H_4$ | | | 0.7 | 1.0 |
| $C_2H_6$ | | | 0.6 | 0.7 |
| $C_3H_6$ | | | 2.0 | 1.8 |
| $C_3H_8$ | | | 0.4 | 0.3 |
| $C_4H_6$ | 0.14 | 0.15 | 6.4 | 4.4 |
| $i\text{-}C_4H_8$ | 0.76 | 0.78 | 1.7 | 1.1 |
| $n\text{-}C_4H_8$ | 8.3 | 8.5 | 35.4 | 23.5 |
| $i\text{-}C_4H_{10}$ | 1.8 | 1.8 | 1.9 | 1.2 |
| $n\text{-}C_4H_{10}$ | 89.0 | 88.7 | 46.5 | 29.8 |
| $C_5+$ | | | 0.6 | 0.4 |

Most of the compounds in the feed other than butane have their source in the recycled butane-rich fraction separated from the product gases.

It is possible to obtain a greater production of butadiene, if desired, by running the process specifically described above so that various zones are under partial vacuum. For example, the butadiene in the product is increased when the process is carried out such that the pressures at the upper ends of the stripper, regenerator and pretreater are −4.9, 0 and 6.9 p.s.i.g. respectively, −2.9 p.s.i.g. in the interior of the stripper, 3 p.s.i.g. in the interior of the regenerator and 0.1 p.s.i.g. at the inlet of the reactor.

I claim as my invention:

1. In effecting the catalytic dehydrogenation of a partially preheated hydrocarbon with a finely divided solid dehydrogenation catalyst at a high temperature above about 1000° F. and a contact time less than about 12 seconds and wherein the reactant vapors and finely divided catalyst are contacted while passing the vapor with the finely divided catalyst in suspension up through a riser reaction zone, the improvement which comprises introducing a heated relatively coarse substantially inert solid heat carrier material near the bottom of said riser reaction zone whereby said heat carrier is carried in suspension up through said riser reaction zone along with the relatively more finely divided catalyst, quenching the mixture leaving the reaction zone and separating the solids from the gases, passing the quenched mixture of catalyst and said inert heat carrier to a separation zone wherein the relatively inert carrier particles settle through the finely divided catalyst particles, withdrawing separated inert heat carrier from near the bottom of said separation zone and passing it to a heating zone, passing heated inert carrier to near the bottom of said riser reaction zone as aforesaid, and separately passing quenched finley divided solid catalyst from said separation zone to near the bottom of said riser reaction zone, whereby said solid finely divided catalyst is at a temperature below that in the reaction zone except during its passage through said riser reaction zone.

2. The process of claim 1 wherein the catalyst and inert particles flow by gravity from the stripping zone to the separation zone, the catalyst flows by gravity from the separation zone to the lower end of the reaction zone, and the inert particles flow by gravity from the separation zone to the inert solids heating zone and from the latter zone to the lower end of the reaction zone.

3. The process of claim 2 wherein the reaction is endothermic and the feed is heated to a temperature not more than 300° F. below the temperature of reaction before being transferred into the reaction zone.

4. The process of claim 3 wherein the catalyst from the separation zone is contacted with a reducing gas in a separate pretreating zone before being sent to the reaction zone and the reducing gas is then transferred to the inert solids heating zone and comprises at least part of the combustible gas introduced to said zone.

5. The process of claim 4 wherein the reaction is the dehydrogenation of butane to butenes and butadiene, the materials remain in the reaction zone under 5 seconds, the catalyst comprises chromia and alumina and the stripping and quenching medium is low pressure steam.

References Cited in the file of this patent

UNITED STATES PATENTS

| | | |
|---|---|---|
| 2,393,636 | Johnson | Jan. 29, 1946 |
| 2,396,109 | Martin | Mar. 5, 1946 |
| 2,446,247 | Scheineman | Aug. 3, 1948 |
| 2,723,223 | Nicholson | Nov. 8, 1955 |